United States Patent [19]

Galbraith et al.

[11] Patent Number: 4,993,029
[45] Date of Patent: Feb. 12, 1991

[54] METHOD AND APPARATUS FOR RANDOMIZING DATA IN A DIRECT ACCESS STORAGE DEVICE

[75] Inventors: Richard L. Galbraith, Rochester, Minn.; Nyles N. Heise, Houston, Tex.

[73] Assignee: International Business Machines Corporation, Armonk, N.Y.

[21] Appl. No.: 322,588

[22] Filed: Mar. 13, 1989

[51] Int. Cl.$^5$ .............................................. G06F 11/10
[52] U.S. Cl. .................................... 371/40.1; 371/2.2; 371/39.1
[58] Field of Search ................ 371/40.1, 40.2, 38.1, 371/39.1, 2.1, 2.2; 360/38.1, 53, 48, 32; 358/336

[56] References Cited

U.S. PATENT DOCUMENTS

| | | | |
|---|---|---|---|
| 4,206,440 | 6/1980 | Doi | 371/38.1 X |
| 4,852,102 | 7/1989 | Yamaguchi | 371/39.1 X |
| 4,907,181 | 3/1990 | Hedtke | 360/32 X |
| 4,914,527 | 4/1990 | Asai | 360/32 X |

Primary Examiner—Jerry Smith
Assistant Examiner—Robert W. Beausoliel
Attorney, Agent, or Firm—Robert W. Lahtinen; F. A. Sirr

[57] ABSTRACT

Data byte fields and corresponding ECC byte fields to be magnetically recorded as multi-byte records is randomized prior to run-length encoding. The randomized/encoded data is then written. When the randomized/encoded data is read back, the data is first decoded, and then derandomized in a complementary fashion. The randomizing avoids the writing of byte patterns that tend to stress the ability of a head/disk interface to record the data transitions at proper linear track positions. When reading, the complementary derandomizing scheme avoids presenting a repeating pattern of read-errors to the ECC network. Thus, read-errors are not propagated through the read channel. Data is randomized, and subsequently derandomized, in a repeating or pseudo random, complementary sequence for each byte. The complementary randomizing/derandomizing sequence is determined by the count contained in a counter. This counter is initialized at the beginning of a record, and is progressively incremented to the predetermined next count as each byte is processed. Data randomizing the first four bits of each byte are multiplied by the first four bits of an 8-bit counter, and the last four bits are multiplied by the last four counter bits. During derandomizing, division by way of multiplication-of-the-inverse is used, as the first four bits of each byte are multiplied by the inverse order of the last counter four bits, and the last four bits are multiplied by the inverse order of the first counter bits.

26 Claims, 5 Drawing Sheets

POLYNOMIAL COUNTER
Forward Polynomial Bits

| | PRESENT STATE | | | | ← NEXT STATE → | | | | | | | |
|---|---|---|---|---|---|---|---|---|---|---|---|---|
| | | | | | WRITE | | | | READ | | | |
| | P0 | P1 | P2 | P3 | P0 | P1 | P2 | P3 | P0 | P1 | P2 | P3 |
| | 0 | 0 | 0 | 1 | 0 | 0 | 1 | 0 | 1 | 0 | 0 | 0 |
| | 0 | 0 | 1 | 0 | 0 | 1 | 0 | 0 | X | X | X | X |
| | 0 | 1 | 0 | 0 | 1 | 0 | 0 | 0 | X | X | X | X |
| | 1 | 0 | 0 | 0 | 0 | 0 | 1 | 1 | 0 | 0 | 1 | 1 |
| BYTE M → | 0 | 0 | 1 | 1 | 0 | 1 | 1 | 0 | 0 | 1 | 1 | 0 |
| | 0 | 1 | 1 | 0 | 1 | 1 | 0 | 0 | 1 | 1 | 0 | 0 |
| | 1 | 1 | 0 | 0 | 1 | 0 | 1 | 1 | 1 | 0 | 1 | 1 |
| | 1 | 0 | 1 | 1 | 0 | 1 | 0 | 1 | 0 | 1 | 0 | 1 |
| | 0 | 1 | 0 | 1 | 1 | 0 | 1 | 0 | 1 | 0 | 1 | 0 |
| | 1 | 0 | 1 | 0 | 0 | 1 | 1 | 1 | 0 | 1 | 1 | 1 |
| | 0 | 1 | 1 | 1 | 1 | 1 | 1 | 0 | 1 | 1 | 1 | 0 |
| BYTE N → | 1 | 1 | 1 | 0 | 1 | 1 | 1 | 1 | 1 | 1 | 1 | 1 |
| | 1 | 1 | 1 | 1 | 1 | 1 | 0 | 1 | 1 | 1 | 0 | 1 |
| | 1 | 1 | 0 | 1 | 1 | 0 | 0 | 1 | 1 | 0 | 0 | 1 |
| | 1 | 0 | 0 | 1 | 0 | 0 | 0 | 1 | 0 | 0 | 0 | 1 |

$P0n = P1 + \text{Read} \cdot \overline{P0} \cdot \overline{P1} \cdot \overline{P2}$ $P1n = P2$ $P2n = P3 + P0 + \text{Read} \cdot \overline{P0} \cdot \overline{P1} \cdot \overline{P2}$ $P3n = P0$ "X" = don't care
"+" = exclusive OR

FIG. 4.

POLYNOMIAL COUNTER
Reverse Polynomial Bits

|  | PRESENT STATE | | | | ← NEXT STATE → | | | | | | | |
|---|---|---|---|---|---|---|---|---|---|---|---|---|
|  |  |  |  |  | WRITE | | | | READ | | | |
|  | P4 | P5 | P6 | P7 | P4 | P5 | P6 | P7 | P4 | P5 | P6 | P7 |
|  | 0 | 0 | 0 | 1 | 0 | 0 | 1 | 0 | 0 | 0 | 1 | 0 |
|  | 0 | 0 | 1 | 0 | 0 | 1 | 0 | 0 | 0 | 1 | 0 | 0 |
|  | 0 | 1 | 0 | 0 | 1 | 0 | 0 | 0 | 1 | 0 | 0 | 0 |
|  | 1 | 0 | 0 | 0 | 1 | 0 | 0 | 1 | 1 | 0 | 0 | 1 |
| BYTE M → | 1 | 0 | 0 | 1 | 1 | 0 | 1 | 1 | 1 | 0 | 1 | 1 |
|  | 1 | 0 | 1 | 1 | 1 | 1 | 1 | 1 | 1 | 1 | 1 | 1 |
|  | 1 | 1 | 1 | 1 | 0 | 1 | 1 | 1 | 0 | 1 | 1 | 1 |
|  | 0 | 1 | 1 | 1 | 1 | 1 | 1 | 0 | 1 | 1 | 1 | 0 |
|  | 1 | 1 | 1 | 0 | 0 | 1 | 0 | 1 | 0 | 1 | 0 | 1 |
|  | 0 | 1 | 0 | 1 | 1 | 0 | 1 | 0 | 1 | 0 | 1 | 0 |
|  | 1 | 0 | 1 | 0 | 1 | 1 | 0 | 1 | 1 | 1 | 0 | 1 |
| BYTE N → | 1 | 1 | 0 | 1 | 0 | 0 | 1 | 1 | 0 | 0 | 1 | 1 |
|  | 0 | 0 | 1 | 1 | 0 | 0 | 0 | 1 | 0 | 1 | 1 | 0 |
|  | 0 | 1 | 1 | 0 | X | X | X | X | 1 | 1 | 0 | 0 |
|  | 1 | 1 | 0 | 0 | X | X | X | X | 0 | 0 | 0 | 1 |

P4n = P5 + P4

P5n = P6 + Write $\overline{P4}$ $\overline{P5}$ P6 P7

P6n = P7 + Write $\overline{P4}$ $\overline{P5}$ P6 P7

P7n = P4 + Write $\overline{P4}$ $\overline{P5}$ P6 P7

"X" = don't care
"+" = exclusive OR

FIG. 5.

FORWARD POLYNOMIAL MULTIPLY $T0 = A0 * B0$
$T1 = (A0 * B1) + (A1 * B0)$
$T2 = (A0 * B2) + (A1 * B1) + (A2 * B0)$ $C0 = (A0 * B3) + (A1 * B2) + (A2 * B1) + (A3 * B0) + T0$
$C1 = (A1 * B3) + (A2 * B2) + (A3 * B1) + T0 + T1$
$C2 = (A2 * B3) + (A3 * B2) + T1 + T2$
$C3 = (A3 * B3) + T2$

REVERSE POLYNOMIAL MULTIPLY $T3 = A4 * B4$
$T4 = (A4 * B5) + (A5 * B4)$
$T5 = (A4 * B6) + (A5 * B5) + (A6 * B4)$
$T6 = T3 + T4$
$T7 = T5 + T6$ $C4 = (A4 * B7) + (A5 * B6) + (A6 * B5) + (A7 * B4) + T7$
$C5 = (A5 * B7) + (A6 * B6) + (A7 * B7) + T3$
$C6 = (A6 * B7) + (A7 * B6) + T6$
$C7 = (A7 * B7) + T7$

"*" = AND
"+" = exclusive OR

FIG. 6.

METHOD AND APPARATUS FOR RANDOMIZING DATA IN A DIRECT ACCESS STORAGE DEVICE

TECHNICAL FIELD

This invention relates to the field of direct access storage devices (DASD) in which binary data is written or stored on non volatile recording media such as magnetic or optical disks. More particularly, this invention relates to the pseudo randomizing of the binary data prior to a disk-write operation. The data is randomized in a manner to avoid the recording of data patterns that may stress the ability of the media to record the data as positionally intended along the length of the media track. The manner in which the data is randomized also avoids data patterns that may stress the ability of the DASD's error recovery network (ECC) to identify and correct read-errors that may occur when the randomized data is subsequently read back from the disk and derandomized.

BACKGROUND OF THE INVENTION

Direct access data storage devices are well known in the art, thus no attempt will be made to describe these devices in detail. It suffices to say that in such devices, and particularly in magnetic disk devices, the ability to properly record or write certain stress sequences of binary "1's" and/or "0's" is a function of the disk-to-head interface and the magnetic recording phenomenon. When an attempt is made to record such stress patterns, the linear track position of the recorded data (i.e. the S-S or N-N magnetic transitions along the track) may shift from the desired position, and as a result, subsequent reading of the data may produce a read-error(s). In addition, it is known that error correction codes are vulnerable to certain data patterns that stress the ability of the ECC to identify and/or correct read-errors. One example of a read stress pattern is a one reoccurring sequence of equal (i.e. repeating) magnitude read-errors.

The present invention relates to the field of DASD, and provides a scheme for randomizing binary data prior to recording, and for derandomizing the randomized data in a complementary (i.e. similar) fashion upon read back, such that write-patterns that stress the head/media interface are avoided, and such that read-patterns that stress the ECC are avoided.

To the knowledge of the present inventors, the concept of randomizing binary data prior to storing the data on disk storage devices, and for the purpose of avoiding data patterns that stress the head/disk interface, is not to be found in the prior art. In addition, it is believed that the concept of, at a later and a random time (i.e. not real time, as in a data transmission system), reading back the randomized data from the disk, and then derandomizing the data prior to presenting the derandomized data to an ECC network, is not to be found in the prior art.

The use of scrambler/descrambler schemes in real time transmission path digital communication systems is known. U.S. Pat. No. 4,639,548 is an example. In this patent, an input data signal is scrambled and then applied to a convolutional encoder. The output of the encoder is then applied to a transmission path. The data transmitted through the transmission path to a receiver is applied first to a convolutional encoder, and then to a descrambler. The descrambler is synchronized to the scrambler by the use of an error correction pulse signal that is generated at the location of the descrambler.

U.S. Pat. No. 3,775,746 also describes the use of a scrambler/descrambler scheme in connection with a real time digital data transmission system. In this system, the scrambler/descrambler function is provided by a network that includes a delay circuit and an exclusive-or gate. Synchronization and clocking are not described in this patent.

U.S. Pat. 3,771,126 describes a data processing and transmission system wherein an analog signal is sampled and encoded by an encoder. A parity generator then adds parity bits to allow for the correction of errors in each block of digital data. The digital data and the parity bits are then converted into a random sequence of pulses by a scrambler, prior to being applied, real time, to a channel. At the output of the channel, the data is descrambled, applied to an error decoder, and then reconstructed into an analog signal, of for use by a utilization circuit. The scrambler is said to be a conventional self-synchronizing scrambler, for example one cell scrambler/descrambler comprising a modulo 2 adder and a one cell delay.

U.S. Pat. 3,988,538 describes scramblers and descramblers for use in digital data transmission systems having a plurality of parallel synchronized data streams. The complementary scramblers/descramblers of this patent are each made up of a series of delay elements (i.e. a shift register) comprising a linear sequential filter having a series of taps (i.e. a tapped delay line) that are summed and then connected in feedback/feedforward fashion to the input of the scrambler/descrambler.

These patents are exemplary of the prior art in which data is scrambled for transmission in real time to a receiver having a descrambler.

While the prior art is useful for the purpose intended, it does not suggest the use of a complementary randomizer/derandomizer combination in the write/read channels of a DASD device. In accordance with the present invention, randomized data is recorded or stored on a non volatile medium such as a magnetic disk. The DASD device is then used to read back the randomized data to a read channel having a complementary derandomizer. The DASD randomizer/derandomizer combination functions to avoid the writing of data patterns that stress the ability to store the randomized data, and also functions to avoid read-error conditions that stress the ability of the read channel's error correcting code (ECC) to identify and correct errors that may occur when the stored, randomized, data is subsequently read back from the disk.

SUMMARY OF THE INVENTION

The present invention provides an apparatus and a method whereby binary data, consisting of user data and corresponding ECC data, is randomized prior to being written on non volatile memory such as the magnetic disk of a DASD device, and is derandomized when the data is subsequently read back off of the disk.

More specifically, user data and corresponding ECC data is first randomized, then run-length encoded, and then written on the disk by the use of a DASD write channel.

Subsequently, when the randomized and encoded data records are read back off of the disk by the use of the DASD read channel, the records are first decoded and then derandomized in a complementary fashion in order to recover the original user data and corresponding ECC data.

In a preferred embodiment of the invention the derandomizer of the read channel is placed intermediate the decoder and the ECC network. In this way, repeating, constant magnitude, read-errors are made to appear as random errors, thus minimizing stress to the ECC network's ability to detect and correct these constant magnitude read-errors.

The scheme for randomizing the binary data (i.e. the user data and corresponding ECC data) is constructed and arranged to avoid the writing of data patterns that may stress the ability of the head/disk interface to record the magnetic transitions at the proper linear track positions on the disk. Later, when the disk is read, the complementary derandomizing scheme avoids presenting a repeating pattern of read-errors to the read channel's ECC network. Thus, read-errors are not propagated through the read channel.

The write channel randomizer, and the read channel derandomizer, may take the form of a finite field data multiplier and divider, respectively, both of which utilize the same type of a pseudo random polynomial counter. In the write channel's randomizer, the data is multiplied by the content of a polynomial counter. In the read channel's derandomizer, the randomized data is divided by the content of a polynomial counter, in order to divide out the multiplication effect of the write channel's randomizer.

In accordance with an embodiment of the invention, the write channel randomizer and the read channel derandomizer can comprise an 8-bit pseudo random counter(s). When the write/read data consists of a string of 8-bit data words, the 8-bit pseudo random counter can be advanced so as to pass through its 255 distinct and different states (the all-0s state is not used) in a predefined and repeating pseudo random fashion, that is, always in the same known, repeating and random sequence, under the control of a byte counter that advances in response to the sequential writing/reading of the multi-byte data being written to the disk or being read off of the disk.

In a less costly and the preferred embodiment of the invention the counter comprises an 8-bit pseudo random polynomial counter that is split into two independent 4-bit pseudo random registers or counters (see FIG. 3).

During the writing of data to the disk, the upper four bits (i.e. bits P0-P3) of the counter (i.e. one of the 4-bit registers) are advanced with exclusive-OR feedback that is derived from a first four-bit polynomial, herein called the "forward polynomial", and the lower four bits (i.e. bits P4-P7) of the counter (i.e. the other of the 4-bit registers) are advanced with exclusive-OR feedback that is derived from a second four-bit polynomial, herein called the "reverse polynomial".

During the writing of data to the disk, the upper four bits (i.e bits P0-P3) of the counter randomly passes through 15 different counting states (the state "0000" is not used) in a known, repeating and pseudo random sequence. The lower four bits (i.e bits P4-P7), however, pass through only 13 of the different counting states.

Subsequently, during the reading of the randomized data, the original data is reproduced by dividing out the multiplication effect of the write channel randomizer. In this case, finite field division is accomplished by a technique known as multiplication by the inverse.

During the reading of data from the disk, the upper four bits (i.e. bits P0-P3) of the counter are again advanced with exclusive-OR feedback that is derived from the above mentioned forward polynomial, and the lower four bits (i.e. bits P4-P7) of the counter are again advanced with exclusive-OR feedback that is derived from the above mentioned reverse polynomial.

During the reading of data from the disk, these upper four bits of the counter (i.e bits P0-P3) pass through only the above mentioned 13 different counting states. The lower four bits of the counter (i.e bits P4-P7), however, pass through the above mentioned 15 different counting states.

Thus, for both the writing of data and the subsequent reading of data, the repetitive counting cycle of the 8-bit polynomial counter consists of 15-times-13 byte cycles, i.e. 195 consecutive data bytes cycles or times.

In summary, in this preferred embodiment data is written to the disk in a randomized form that is provided by the sequential counting of the 8-bit pseudo random polynomial counter, the counter operating to repeat its counting sequence during each sequential field of 195 data bytes being written to the disk—and—the randomized data is subsequently read back from the disk as the 8-bit polynomial counter within the read channel's derandomizer operates to divide out the data-multiplication that was effected during an earlier write operation by the polynomial counter within the write channel's randomizer. Here again, the counter operates to repeat its counting sequence during each sequential field of 195 data bytes being read from the disk.

As seen in FIG. 3, in a preferred embodiment of the invention, a single polynomial counter 40 functions in both the write channel and the read channel.

In this preferred embodiment, the forward and reverse polynomials, as above defined, are chosen so that the binary content of one 4-bit portion of the counter is the inverse of the binary content of the other 4-bit portion of the counter.

Specifically, the "forward polynomial" is selected to be $g(x)=x^4+x+1$, and the "reverse polynomial" the is selected to be $g(x)=x^4+x^3+1$.

These two polynomials are chosen so that if the particular polynomial word of the counter (i.e. bits P0-P7) that was used to randomize a given data byte is reversed, and then used when the randomized byte is subsequently read back, the word-content of the counter (i.e. bits P0-P7) during reading is the inverse of the content of the word-content when writing, and in this way the randomized byte is divided by the original multiplier, and the byte is thus derandomized.

By choosing these two polynomials in this manner, the same counter construction and arrangement can be used for both the write channel's randomizer and the read channel's derandomizer.

In the preferred embodiment of FIG. 3, the procedure for randomizing a write-data byte requires that counter 40 be initialized or seeded to a specific state, in this example to P0-P7="00010001". The upper four bits (i.e. CW0-CW3) of write data are now multiplied by the upper four bits (i.e. P0-P3) of the counter, and the lower four bits (i.e. CW4-CW7) of write data are now multiplied by the lower four bits (i.e. P4-P7) of the counter. The counter is advanced to its next randomizing count state, and the above mentioned multiplication repeats for the next write-data byte, using the next pseudo random state of the counter. When the next write field (see 11 of FIG. 1) arrives, the counter is again initialized to "00010001", and the process repeats for this next write-data field.

The procedure for derandomizing a randomized read-data field requires that the counter be initialized or seeded to the state P0-P7 = "10001000" for this example. The upper four bits (i.e. R0-R3) of the read-back data are now multiplied by the inverse order of the lower four bits (i.e. P4-P7) of the counter, and the lower four bits (i.e. R4-R7) of the read-back data are now multiplied by the inverse order of the upper four bits (i.e. P0-P3) of the counter. The counter is then advanced to its next count state for the next read-back data byte, and the above mentioned multiplication-by-the-inverse process repeats. When the next read-back field arrives, the counter is again initialized to "10001000", and the process repeats for this read-back data field.

An object of the present invention is to provide a method and an apparatus for recording and subsequently reading binary data utilizing nonvolatile storage media such as a magnetic recording disk, wherein a data record is randomized prior to being written, and upon reading the randomized data record back, the data record is derandomized in a complementary fashion.

Another object of the invention is to run-length encode the data record after randomization and prior to writing, and to run-length decoding the read-back data record in a complementary fashion prior to derandomization.

Yet another object of the invention is to randomize a multi-byte data record, and subsequently derandomize the read-back data record in a pseudo random complementary sequence for each byte of the data record and the read-back data record.

Another object of the invention is to provide a complementary randomizing/derandomizing sequence as is determined by the binary count contained in a pseudo random counter, the count of the counter being initialized at the beginning of the multi-byte data record record and the corresponding multi-byte read-back data record, and the counter being progressively incremented to a next predetermined count as each byte of the multi-byte data record and each byte of the multi-byte read-back data record is progressively processed.

Yet another object of the invention is to provide, during data randomization, multiplication of the first four bits of each data record byte by the first four bits of a pseudo random 8-bit counter, and multiplying the last four bits of each data record byte by the last four bits of the 8-bit counter, and subsequently, during derandomizing of the read-back data record, to provide multiplication-by-the-inverse by multiplying the first four bits of each read-back data record byte by the inverse order of the last four bits of the 8-bit counter, and multiplying the last four bits of each read-back record byte by the inverse order of the first four bits of the 8-bit counter.

These and other objects and advantages of the invention will be apparent to those of skill in the art upon reference to the following detailed description of the invention, having reference to the drawing.

DETAILED DESCRIPTION OF THE INVENTION

This invention will be described without detailed reference being made to the construction and arrangement details of a DASD disk file. Devices of this type are well known to those skilled in the art. Since the present invention comprises an improvement(s) to the write-channel/read-channel of these devices, only that portion of a DASD device will be described.

Figure 1:
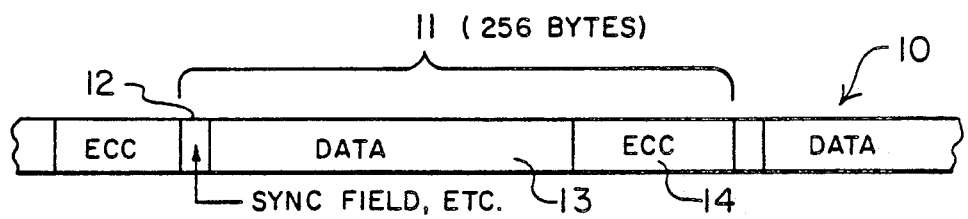
FIG. 1 shows a representative binary data field of the type that is to be randomized, encoded and then recorded on magnetic media by the use of the invention, and which is subsequently read back, decoded and derandomized by the use of the invention.

With reference to FIG. 1, the binary data represented therein is to be linearly written to a track(s) of a magnetic recording disk (not shown), after the data has been both randomized and encoded.

The binary data that is read back off of the disk is ideally identical to the written data, and is thus also represented as being identical to that of FIG. 1.

FIG. 1 comprises an exemplary linear disk track 10 having a serial string of individual data fields 11, each individual field of which is here shown as comprising an exemplary 301 bytes. Each data field 11 begins with a start or synchronizing area 12 which is, for example, 12 bytes long. Area 12 includes a synchronization signal that identifies the beginning of each individual data field 11 within track 10. Area 12 also includes other information, such as servo IDs, etc., as is well known to those of skill in the art.

It should be noted that area 12 is not randomized/derandomized by operation of the invention, i.e. area 12 is encoded and then recorded in its encoded form. Subsequently, when a data field 11 is read back from the disk, the not-randomized area 12 is decoded and then detected. This detection event is used to synchronize the read channel's derandomizer 34 (FIG. 2), as will be explained.

The next portion of each data field 11 comprises an area 13 which is, for example, 256 bytes long. This portion 13 of data field 11 contains the variable user information or data that is to be recorded or stored by the DASD device on its non volatile disk memory. The present invention is of particular utility when this user data portion 13 comprises a number of identical repeating bytes, such as the byte "11111111" for example that is shown in the following Table A. Repeating data of this general type is often found in user data that defines a graphic image. It has been found that these repeating byte patterns tend to stress both the magnetic recording phenomenon and conventional ECC algorithms.

The DASD device includes an error correction code (ECC) network 25 (FIG. 2) that analyses the user information 13 to be recorded. This ECC network generates the binary content of an ECC area 14, which is for example 10 bytes long. ECC area 14 is also randomized, encoded, and recorded. Area 14 will be used by the read channel's ECC network 36 (FIG. 2). after decoding and derandomizing, to identify read-errors, and to recover from any such errors as may result when reading recorded data from the disk.

As will be apparent, only areas 13 and 14 are randomized in accordance with the invention.

As is well known to those of skill in the art, certain binary sequences or patterns are to be avoided when writing binary data to a magnetic recording disk, since these binary patterns stress the ability of the head/disk interface to accurately position the magnetic transitions at the desired positions linearly along the track surface of the disk.

In addition, certain stressful read-back data bit patterns appear to cause higher error rates than do random read-back data patterns. If these troublesome read stress patterns are frequently repeated, the read-errors that do occur tend to have equal magnitudes, i.e. each byte that is in error miscompares with the original write data byte in the same bit position for each of the error repetitions. This type of equal-magnitude error condition causes a higher susceptibility to data miscorrection for some ECC codes. That is, certain sequences of detected errors that occur when reading data from the disk stress the ability of the ECC to identify and/or recover from these read-error conditions. In fact, read-error conditions may remain undetected/corrected as a result of reading patterns that stress the ECC.

The present invention provides data randomizing prior to the writing of data areas 13,14 to the disk, and provides similar, complementary, data derandomizing upon subsequently reading the randomized data areas 13,14 from the disk, so as to avoid both magnetic stress conditions and ECC stress conditions. The benefit of the invention is two-fold. First, repeating bytes of customer data are made to appear as random data prior to being written on the disk. Second, even if equal magnitude errors (i.e. multiple errors that are equally bit-spaced) do occur when subsequently reading the randomized data, these errors appear random to the read channel's ECC network, and thus a lower miscorrection rate is achieved.

Figure 2:
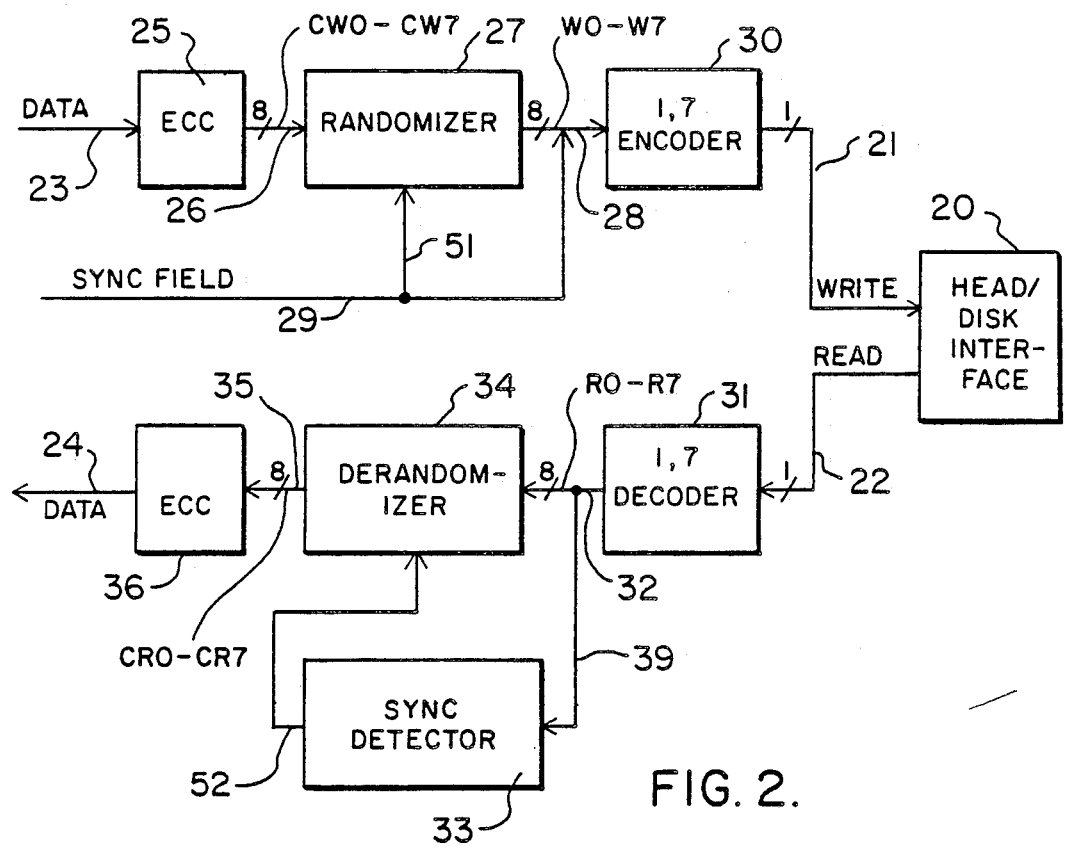
FIG. 2 shows the write-channel/read-channel portion of a direct access storage device that is constructed in accordance with the invention.

FIG. 2 is a simplified diagram showing the read and the write channels of a DASD device constructed in accordance with the invention. In this figure the transducing interface that exists between a read/write transducing head(s) and the disk(s) is shown at 20.

The user data portion 13 (i.e. the user data in its not-encoded and not-randomized form) of the exemplary data track of FIG. 1 is present to the write channel by way of conductor 23 during a write operation. This identical data portion 13 will be present on the read channel's output conductor 24 during a subsequent read operation, i.e., the user data 13 that is to be recorded on the disk is presented to conductor 23 during a write operation, and this same user data will be subsequently recovered from conductor 24 during a read operation.

The sync field area 12 of the FIG. 1 track is presented to the read channel by way of conductor or bus 29, and is also present on read channel conductor or bus 39 during a subsequent read operation.

As is well known to those of skill in the art, one of the functions provided in a DASD device is the generation of the FIG. 1 ECC binary data field 14 that is uniquely related to the binary content of the user data portion 13 that exists on conductor 23. This function is provided in FIG. 2 by operation of ECC network 25. The output of network 25 (which includes the operation of other well known circuit means, not shown) comprises an 8-bit wide bus 26, containing a series of 8-bit words (bytes) whose bits are identified for purposes of explanation as bits CW0 through CW7. In accordance with the invention, each such data byte (i.e. each word comprising bits CW0–CW7) is randomized by the operation of pseudo random randomizing network means 27. The randomized data is then presented to 8-bit bus 28 as a series of randomized bytes, each byte having bits identified for purposes of explanation as W0 through W7.

As is well known to those skilled in the art, a synchronization data field (see area 12 of FIG. 1) is presented to the write channel of FIG. 2 in order to mark and identify the beginning of each field 11 of disk track 10. This sync information is presented to the write channel by way of conductor 29. In addition to being encoded and then recorded in its encoded form on the disk track, this sync information operates to initialize the operation of randomizer 27 at the beginning of each data field 11 of track 10 (for example, sync field 12 operates to provide a starting seed for the pseudo random polynomial counter 40 of FIG. 3).

In accordance with standard practice, the output of randomizer 27 is combined with the sync information on conductor 29, and both are then subjected to the operation of a run-length-limited encoder 30, for example a 1,7 encoder.

The final operation of the FIG. 2 write channel, which involves the operation of other well known circuit means (not shown), is to present a randomized/encoded serial binary data byte stream to conductor 21, for recording on the disk track(s) in the form of S-S and N-N magnetic transitions.

Later, when reading the randomized/encoded data back from the disk, a serial byte stream is provided to conductor 22. This byte stream is first decoded by operation of a complementary decoder 31.

By virtue of the operation of decoder 31, and by virtue of the operation of other conventional circuit means not shown, the decoded byte stream is provided to 8-bit bus 32 and to sync detector 33 in the form that is seen in FIG. 1. The signal on conductor 39 includes the sync field portion 12, which portion is detected by sync detector network 33. Network 33 operates to synchronize and begin the operation of complementary pseudo random derandomizer 34 at the beginning of each data field 11 (for example, sync field 12 operates to provide a starting seed for the pseudo random polynomial counter 40 of FIG. 3).

For purposes of explanation, the 8 bits presented as an input to complementary derandomizer 34 are identified as bits R0 through R7, and the corresponding derandomized output bits which appear on output 8-bit bus 35 of derandomizer 34 are identified as bits CR0–CR7. As will be apparent, the derandomized data bytes represented by bits CR0–CR7 are identical to the data bytes originally presented to the input of randomizer 27, which original data bytes are represented in the figure as having bits CW0–CW7.

The output of the FIG. 2 read channel comprises complementary ECC network 36, and other well known circuit means not shown. By way of ECC network 36, the data 13 originally presented to conductor 23 is recovered from the read channel's output conductor 24.

Figure 3:
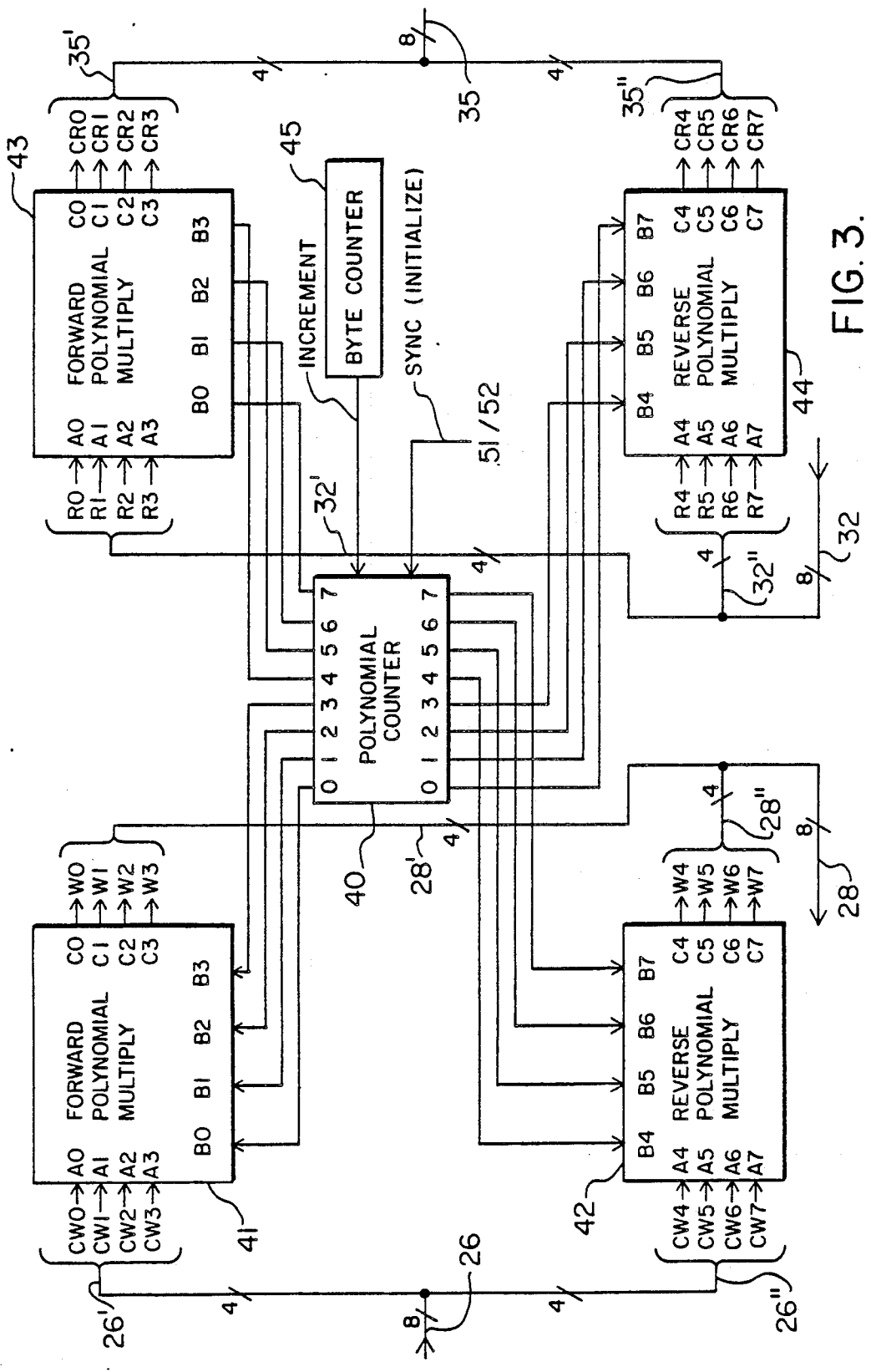
FIG. 3 shows an embodiment of a randomizer/derandomizer for use in the device of FIG. 2, and FIGS. 4, 5 and 6 are used to describe the operation of the randomizer/derandomizer of FIG. 3.

FIG. 3 shows a preferred embodiment of the invention wherein the above mentioned pseudo random polynomial counter comprises an 8-bit counter 40 that is split into two registers or counters comprising bits P0–P3 and bits P4–P7, respectively. In this embodiment, counter 40 is shared by the write channel randomizer 27 and the read channel derandomizer 34 of FIG. 1.

Polynomial counter 40 consists of eight latches, having next-count-state logic. The next-state chart and the next-state logic equations for the forward polynomial portion P0–P3 of the counter is given in FIG. 4. The next-state chart and the next-state logic equations for the reverse polynomial portion P4–P7 of the counter is given in FIG. 5.

For example, consider FIGS. 4 and 5 for a write operation, and assume that a write data byte M is currently being randomized. For this explanation, the actual binary content of data byte M is not identified since it is not critical to the explanation. In this case, the current content of the polynomial counter is "00111001". That is, the current content of the forward polynomial counter bits P0–P3 is "0011", as is shown in the byte M position of the "Present State" column of FIG. 4, and the current content of the reverse polynomial counter bits P4–P7 is "1001", as is shown in the byte M position of the "Present State" column of FIG. 5.

For this assumed write operation, the next state of the forward polynomial counter bits P0–P3 is identified in the "Write38 column of FIG. 4 as "0110", as is shown in the byte M position of that column, and the next state of the reverse polynomial counter bits P4–P7 is identified in the "Write" column of FIG. 5 as "1011" in the byte M position of that column. Note that in this case, the next state conditions correspond to the entry in the "Present State" column that follows the identified byte M position. This characteristic of FIGS. 4 and 5 is not critical however.

Now assume that a read operation is currently underway and that read-back data byte N is currently being derandomized. Again, the actual data content of byte N is not shown, nor is it critical. In this case, the current content of forward polynomial counter bits P0–P3 is "1110", as is identified at the byte N position in the "Present State" column of FIG. 4, and the current content of reverse polynomial counter bits P4–P7 is "1101", as is identified at the byte N position in the "Present State" column of FIG. 5.

For this assumed read operation, the next state of the forward polynomial counter bits P0–P3 is identified in the "Read" column of FIG. 4 as "1111", as is shown in the byte N position of that column, and the next state of the reverse polynomial counter bits P4–P7 is identified in the "Read" column of FIG. 5 as "0011".

For this preferred embodiment of pseudo random count sequence, note from FIG. 4 that in a read operation, when the present state of the forward polynomial bits P0–P1 is "0001" the next state of these bits will be "1000", i.e. the two entries "0010" and "0100" shown in the "Present State" column are not used. Also note from FIG. 5 that for a write operation, when the present state of the reverse polynomial counter bits P4–P7 is "0011" the next state of these bits will be "0001", i.e. two entries "0110" and "1100" in the "Present State" column are not used.

Note that while data bytes M and N, as referred to above, have a certain relationship as seen in FIGS. 4 and 5, i.e. they are separated by six intervening data bytes, this relationship is not critical, and in fact bytes M and N have been arbitrarily identified in these figures. In addition, the 4-bit pseudo random sequence shown in the three columns of FIGS. 4 and 5 are not to be taken as a limitation on the invention, since those skilled in the art will readily visualize other distinct sequences that will also function within the spirit and scope of the invention.

The next-state logic equations for forward polynomial counter bits P0–P3 is given in FIG. 4, and the next-state logic equations for reverse polynomial counter bits P4–P7 is given in FIG. 5.

The equation terms such as "P0n" of FIGS. 4 and 5 mean the "next binary value" of the forward polynomial counter bit P0, and the equation terms such as "P0" mean the "current or present binary value" of the forward polynomial counter bit P0.

That is, in the above write example (where write byte M was being randomized, the current value of P0 was equal to "0", and its next state value for the next write byte M+1 was equal to "0") the next state value of "0" for P0 is determined by the Boolean equation given in FIG. 4, which equation requires use of the current values "0", "0" and "1" of forward polynomial bits P0, P1 and P2, respectively.

Note from FIGS. 4 and 5 that P1n, i.e. the next value of P1, equals the current or present value of P2, that the next value of P3 equals the current value of P0, and that the next value of P4 equals the exclusive OR of the current value of P5 and P4.

As for the next value of P2 (i.e. P2n), P5, P6 and P7, these values are given by the Boolean equations of FIGS. 4 and 5, which equation requires the current values of the polynomial bits as is shown in the figures.

The columns and equations of FIGS. 4 and 5 define the pseudo randomness of the preferred embodiment of counter 40, but as those skilled in the art will recognize, other pseudo random binary counting sequences can be originated within the spirit and scope of the invention to satisfy multiplication-by-the-inverse.

During a write operation, the 4-bit register P0–P3 of counter 40 counts in a pseudo random manner as is defined by the above mentioned forward polynomial, and as is shown in the "Write" column of FIG. 4, as the 4-bit register P4–P7 of counter 40 counts in a pseudo random manner as is defined by the above mentioned reverse polynomial, and as is shown in the "Write" column of FIG. 5.

During a read operation, the 4-bit register P0–P3 of counter 40 counts in accordance with the forward polynomial, and as is shown in the "Read" column of FIG. 4, as the 4-bit register P4–P7 of counter 40 counts in accordance with the reverse polynomial, and as is shown in the "Read" column of FIG. 5. In this way, randomizing by a multiplication process is achieved, and derandomization by a complementary multiplication-by-the-inverse process is achieved.

Counter 40 cooperates with four 4-bit by 4-bit multiplier networks 41–44.

Networks 41 and 43 operate to multiply counter input bits B0–B3 and data input bits A0–A3 as is defined by the "FORWARD POLYNOMIAL MULTIPLY" portion of FIG. 6, and networks 42 and 44 operate to multiply counter input bits B4–B7 and data input bits A4–A7 as is defined by the "REVERSE POLYNOMIAL MULTIPLY" portion of FIG. 6.

Networks 41 and 43 are identical in construction. However, note that the counter-input terminals B0–B3 of network 41 and the counter-input terminals B0–B3 of network 41 are reverse connected to polynomial counter 40. That is, B0–B3 of network 41 are connected to counter bits P0–P3 in an advancing order manner, but B0–B3 of network 43 are connected to counter bits P4–P7 in an inverse order manner.

Also, networks 42 and 44 are identical in construction. Again, note that the counter-input terminals B4-B7 of network 42 and the counter-input terminals B4-B7 of network 41 are reverse connected. That is, B4-B7 of network 42 are connected to counter bits P4-P7 in an advancing order manner, but B4-B7 of network 44 are connected to counter bits P0-P3 in an inverse order manner.

In this embodiment of the invention the write channel's randomizer 27 of FIG. 1 is made up of counter 40, forward-polynomial-multiplier network 41 and reverse-polynomial-multiplier network 42, and the read channel's derandomizer 34 of FIG. 1 is made up of counter 40, forward-polynomial-multiplier network 43 and reverse-polynomial-multiplier network 44.

As shown in FIG. 3, the write channel's 8-bit bus 26 of FIG. 1 splits into two 4-bit buses 26' and 26" in order to present the lower four bits CW0-CW3 of each write channel byte to forward-polynomial-multiplier network 41 by way of 4-bit bus 26', and to present the upper four bits CW4-CW7 of each write channel byte to reverse-polynomial-multiplier network 42 by way of 4-bit bus 26".

The output of randomizer 40,41,42 comprises 8-bit bus 28. In FIG. 3, bus 28 is formed by the two 4-bit busses 28' and 28" that receive the randomized byte as two 4-bit portions W0-W3 and W4-W7 from networks 41 and 42, respectively.

Also as shown in FIG. 3, the read channel's 8-bit bus 32 Of FIG. 1 splits into two 4-bit buses 32' and 32" in order to present the lower four bits R0-R3 of each read channel byte to forward-polynomial-multiplier network 43 by way of 4-bit bus 32', and to present the upper four bits R4-R7 of each read channel byte to reverse-polynomial-multiplier network 44 by way of 4-bit bus 32".

The output of derandomizer 40,43,44 comprises 8-bit bus 35. In FIG. 3, bus 35 is formed by the two 4-bit busses 35' and 35" that receive the derandomized byte as two 4-bit portions CR0-CR3 and CR4-CR7 from networks 43 and 44, respectively.

A conductor 40/41 of FIG. 3 provides the synchronization of counter 40, as the counter functions in either the write channel or the read channel, respectively, as was described relative FIG. 2.

As data fields 13,14 of FIG. 1 are being written to the disk (i.e. counter 40 is now functioning in the write channel's randomizer 40,41,42), byte counter 45 operates to increment counter 40 to its next pseudo random count state upon the processing of each individual byte within write data field 13,14. When the next sync field signal 12 is encountered, as provided by conductor 51 of FIG. 2, counter 40 is initialized or reseeded, and the randomizing process repeats for each individual byte within the next write data field 13,14.

As data fields 13,14 of FIG. 1 are subsequently read back from the disk (i.e. counter 40 is now functioning in the read channel's derandomizer 40,43,44), byte counter 45 again operates to increment counter 40 to its next count state upon the processing of each individual byte within read data field 13,14. When the next sync field signal 12 is detected, as provided by sync detector 33 and conductor 52 of FIG. 2, counter 40 is initialized or reseeded, and the derandomizing process repeats for each individual byte within the next read data field 13,14.

The following Table A shows the beginning and the ending portions of the 196 cycles of counter 40 of FIG. 3 for an exemplary and repeating write data pattern "11111111". While counter 40 can be started or seeded to any one of its 195 valid count states, Table A is made to be consistent with the above explanation where the counter is seeded to the state "00010001" for a write operation, and is seeded to the state "10001000" for a read operation.

TABLE A

| Writing | | | Reading | | |
|---|---|---|---|---|---|
| (1) | (2) | (3) | (4) | (5) | (6) |
| pppppppp 01234567 | cccccccc wwwwwwww 01234567 | wwwwwwww 01234567 | pppppppp 01234567 | rrrrrrrr 01234567 | cccccccc rrrrrrrr 01234567 |
| 00010001 | 11111111 | 11111111 | 10001000 | 11111111 | 11111111 |
| 00100010 | 11111111 | 11010111 | 00111001 | 11010111 | 11111111 |
| 01000100 | 11111111 | 10011110 | 01101011 | 10011110 | 11111111 |
| 10001000 | 11111111 | 00010101 | 11001111 | 00010101 | 11111111 |
| 00011001 | 11111111 | 00101001 | 10110111 | 00101010 | 11111111 |
| 01101011 | 11111111 | 01001101 | 01011110 | 01001101 | 11111111 |
| 11001111 | 11111111 | 10000011 | 10100101 | 10000011 | 11111111 |
| 10110111 | 11111111 | 00110110 | 01111010 | 00110110 | 11111111 |
| 01011110 | 11111111 | 01101100 | 11101101 | 01101100 | 11111111 |
| 10100101 | 11111111 | 11000001 | 11110011 | 11000001 | 11111111 |
| 01111010 | 11111111 | 10110010 | 11010110 | 10110010 | 11111111 |
| 11101101 | 11111111 | 01010100 | 10011100 | 01010100 | 11111111 |
| 11110011 | 11111111 | 10101000 | 00010001 | 10101000 | 11111111 |
| 11010001 | 11111111 | 01111111 | 10000010 | 01111111 | 11111111 |
| 10010010 | 11111111 | 11100111 | 00110100 | 11100111 | 11111111 |
| 00010100 | 11111111 | 11111110 | 01001000 | 11111110 | 11111111 |
| " | " | " | " | " | " |
| " | " | " | " | " | " |
| " | " | " | " | " | " |
| 00011101 | 11111111 | 11110100 | 10011000 | 11110100 | 11111111 |
| 00100011 | 11111111 | 11011000 | 00011001 | 11011000 | 11111111 |
| 01000001 | 11111111 | 10011111 | 10001011 | 10011111 | 11111111 |
| 10000010 | 11111111 | 00111111 | 00111111 | 00010111 | 11111111 |
| 00110100 | 11111111 | 00101110 | 01100111 | 00101110 | 11111111 |
| 01101000 | 11111111 | 01000101 | 11001110 | 01000101 | 11111111 |
| 11001001 | 11111111 | 10001010 | 10110101 | 10001010 | 11111111 |
| 10111011 | 11111111 | 00111101 | 01011010 | 00111101 | 11111111 |
| 01011111 | 11111111 | 01100011 | 10101101 | 01100011 | 11111111 |
| 10100111 | 11111111 | 11000110 | 01110011 | 11000110 | 11111111 |
| 01111110 | 11111111 | 10111100 | 11100110 | 10111100 | 11111111 |

TABLE A-continued

| Writing | | | Reading | | |
|---|---|---|---|---|---|
| (1) | (2) | (3) | (4) | (5) | (6) |
| 11100101 | 11111111 | 01010001 | 11111100 | 01010001 | 11111111 |
| 11111010 | 11111111 | 10100010 | 11010001 | 10100010 | 11111111 |
| 11011101 | 11111111 | 01110100 | 10010010 | 01110100 | 11111111 |
| 10010011 | 11111111 | 11101000 | 00010100 | 11101000 | 11111111 |
| 00010001 | 11111111 | 11111111 | 10001000 | 11111111 | 11111111 |

Column (1) of the table shows the pseudo random counting states of counter 40 for a write operation, while column (4) shows the pseudo random counting states for a read operation.

In this example, the data to be randomized is the reoccurring byte "11111111" as shown in column (2). Data of this type poses a major problem for both magnetic recording stress and error recovery stress, and it is of the type that is found in the recording of graphics data, for example. This data is recovered, by derandomization, as is shown in column (6).

Column (3) shows the randomized bytes that are written to the disk (i.e. the data of column (2) is randomized to produce the data of column (3)), and column (5) shows the read-back of this written data. Thus, columns (3) and (5) are identical.

Note that at the occurrence of the 13th data byte during a write operation (i.e.column (1)) counter bits P4-P7 have completed all 13 of the pseudo random count states, and for the 14th data byte, the bits P4-P7 are restored to the byte-1 state of "0001". Also, note that at the occurrence of the 15th data byte during a write operation counter bits P0-P3 have completed all 15 of the pseudo random count states, and for the 16th data byte, the bits P0-P3 are restored to the byte-1 state of "0001". This pseudo count sequence for counter bits P0-P7 continues until either the 196th data byte is received, or a synchronization signal 12 is received, whereupon the counters bit state becomes "00010001".

For a read operation, at the occurrence of the 13th data byte (i.e.column (4)) counter bits P0-P3 have completed all 13 of the pseudo random count states, and for the 14th data byte, the bits P0-P3 are restored to the byte-1 state of "1000". Also, note that at the occurrence of the 15th data byte during a read operation counter bits P4-P7 have completed all 15 of the pseudo random count states, and for the 16th data byte, the bits P4-P7 are restored to the byte-1 state of "1000". This sequence continues until either the 196th data byte is received, or a synchronization signal 12 is received, whereupon the counters bit state becomes "10001000".

The above description of referred embodiments of the invention relate to the basic concept of the invention, as well as to specific examples whereby this basic concept may be implemented. Other embodiments of the invention will be apparent to those skilled in the art, based upon the basic concept teaching of this invention. Therefore, the above teachings are not to be taken as a limitation on the invention. Rather, the scope and content of the inventions is to be as is defined in the following claims.

What is claimed is:

1. Binary data storage apparatus, comprising;
    writing/reading transducer means associated with non volatile data storage media means to form a transducer/media interface,
    a write channel having
        first data-input means adapted for the reception of binary data to be written to said media means, said binary data comprising a plurality of multi-byte data fields,
        second data-input means adapted for the reception of an identifying data field for each of said multi-byte data fields,
        randomizer means having first input means connected to said first data-input means to thereby receive said multi-byte data fields, said randomizer means having second input means connected to said second data-input means and being responsive to said identifying data field to begin a repetitive sequence of data randomizing for each byte of said multi-byte data field, and providing an output comprising a plurality of randomized multi-byte data fields, and
        means connecting said transducer/media interface to the output of said randomizer means and to said second data-input means, whereby randomized data comprising a plurality of multi-byte data fields, each data field including an identifying data field, is written on said non volatile media means, and
    a read channel having
        read interface means comprising said transducer/media interface whereby said randomized data is read back from said non volatile meadia means,
        read-data input means connected to said transducer/media interface for the reception of said read-back randomized data,
        identifying data detector means having an output, and having an input connected to said read-data input means for detecting the identifying data field of each read-data field, and
        complementary derandomizer means having first input means connected to said read-data input means, to receive said randomized data, said derandomizer means having second input means connected to the output of said identifying data detector means, said derandomizer means being responsive to detection of an identifying data field to begin a complementary sequence of derandomizing of each byte of said read-data field.

2. The data storage apparatus of claim 1 wherein said data storage media means is magnetic disk storage means.

3. The data storage apparatus of claim 2 wherein said randomizer means and said derandomizer means include pseudo random counter means.

4. The data storage apparatus of claim 1, wherein the first data-input means of said write channel includes ECC network means, and wherein said read channel includes complementary ECC network means connected to the output of said derandomizer means.

5. The data storage apparatus of claim 4 wherein said randomizer means and said derandomizer means include complementary pseudo random counter means.

6. The data storage apparatus of claim 5 wherein said data storage media means is magnetic disk storage means.

7. The data storage apparatus of claim 1,
wherein the write channel means connecting said transducer/media interface to the output of said randomizer means includes encoder means, and
wherein the read channel read-data input means connecting said transducer/media interface for the reception of said multi-byte randomized data fields includes decoder means.

8. The data storage apparatus of claim 7 wherein said data storage media means is magnetic disk storage means.

9. The data storage apparatus of claim 8 wherein said randomizer means includes pseudo random counter means operable to multiply each byte of said multi-byte data field by a pseudo random polynomial function, and wherein said derandomizer means includes complementary pseudo random counter means operable to multiply said multi-byte read-data field in accordance with the inverse of said pseudo random polynomial function.

10. The data storage apparatus of claim 1,
wherein the first data-input means of said write channel includes ECC network means,
wherein said read channel includes complementary ECC network means connected to the output of said derandomizer means,
wherein the write channel means connecting said transducer/media interface to the output of said randomizer means includes encoder means, and
wherein the read channel read-data input means connected said transducer/media interface for the reception of said randomized data and said identification field includes decoder means.

11. The data storage apparatus of claim 10 wherein said randomizer means and said derandomizer means include pseudo random counter means.

12. The data storage apparatus of claim 11 wherein said data storage media means is magnetic disk storage means.

13. The data storage apparatus of claim 12 wherein said randomizer means includes a pseudo random counter means operable to multiply each byte of said multi-byte data field by a pseudo random polynomial function, and wherein said derandomizer means includes pseudo random counter means operable to multiply said multi-byte read-data field in accordance with the inverse of said pseudo random polynomial function.

14. A method for writing, and later reading, binary data and corresponding ECC data in a DASD magnetic recording device,
the writing steps of the method providing for data randomization in a manner to minimize the writing of data patterns that stress magnetic recording media within said DASD device, and
the reading steps of the method subsequently providing data derandomization in a manner to minimize read-error patterns that stress the ECC function,
the method comprising the steps of;
providing writing/reading transducer means associated with said magnetic recording media to form a transducer/media interface,
providing a write channel having
write-data input means adapted for the reception of binary data fields to be written to said magnetic recording media,
ECC network means having input means connected to said write-data input means, said ECC network means having output means,
randomizer means having input means connected to the output means of said ECC network means, said randomizer means having output means, and
means connecting said transducer/media interface to the output means of said randomizer means whereby randomized data fields may be stored on said magnetic recording media, and
providing a read channel having
read interface means comprising said transducer/media interface whereby said stored, randomized, data fields may be read back from said magnetic recording media,
read-data input means connected to said transducer/media interface for the reception of said randomized data fields,
complementary derandomizer means having input means connected to said read-data input means to receive said randomized data fields, said derandomizer means having output means,
complementary ECC network means connected to the output means of said derandomizer means, said complementary ECC network means having output means, and
read-data output means connected to the output means of said complementary ECC network means.

15. The method of claim 14 including the step of providing said magnetic recording media in the form of magnetic disk means.

16. The method of claim 14 including the step of providing said randomizer means and said derandomizer means in the form of pseudo random counter means.

17. The method of claim 16 including the step of providing said magnetic recording media in the form of magnetic disk means.

18. The data storage apparatus of claim 14 including the steps of
providing means for encoding the output of said randomizer means prior to writing said randomized data fields on said magnetic recording media, and
providing complementary decoder means connected to said read-data input means for the reception of said read-back randomized data fields.

19. The method of claim 18 including the step of providing said magnetic recording media in the form of magnetic disk means.

20. The method of claim 14 including the steps of
providing said randomizer means in the form of pseudo random counter means that is operable to multiply said binary data fields by a pseudo random polynomial function, and
providing said derandomizer means in the form of complementary pseudo random counter means that is operable to multiply said read-back randomized binary data fields in accordance with the inverse of said pseudo random polynomial function.

21. The data storage apparatus of claim 20 including the steps of
providing means for encoding the output of said randomizer means prior to writing said randomized data fields on said magnetic recording media, and
providing complementary decoder means connected to said read-data input means for the reception of said read-back randomized data fields.

22. The method claim 21 including the step of providing said magnetic recording means in the form of magnetic disk storage means.

23. A method of recording and subsequently reading a binary data record on magnetic recording media, comprising the steps of;
    randomizing said data record,
    run-length encoding said randomized data record,
    writing said randomized and encoded data record on said magnetic media,
    reading said randomized and encoded data record back of off said magnetic media,
    run-length decoding said read-back data record in a complementary fashion, and
    derandomizing said decoded read-back data record in a complementary fashion.

24. The method of claim 23, wherein said data record comprises a multi-byte record, and including the steps of
    randomizing said data record, and subsequently derandomizing said read-back data record, in a pseudo random complementary sequence for each byte of said data record and said read-back data record.

25. The method of claim 24 wherein the complementary randomizing/derandomizing sequence is determined by the binary count contained in a counter, the count of said counter being initialized at the beginning of said data record and said read-back data record, and said counter being progressively incremented to a next predetermined count as each byte of said multi-byte data record and each byte of said multi-byte read-back data record is progressively processed.

26. The method of claim 25 wherein said counter is an 8-bit counter, and including the steps of
    during data randomizing multiplying the first four bits of each data record byte by the first four bits of said 8-bit counter, and multiplying the last four bits of each data record byte by the last four bits of said 8-bit counter, and
    subsequently, during derandomizing of said read-back data record data, performing a multiplication-of-the-inverse process by multiplying the first four bits of each read-back data record byte by the inverse order of the last four bits of said 8-bit counter, and multiplying the last four bits of each read-back record byte by the inverse order of the first four bits of said 8-bit counter.

* * * * *